E. H. GAMBLE.
PROCESS FOR THE PRODUCTION OF PHOTOMECHANICAL PRINTING SURFACES.
APPLICATION FILED JUNE 26, 1913.
1,102,903.
Patented July 7, 1914.
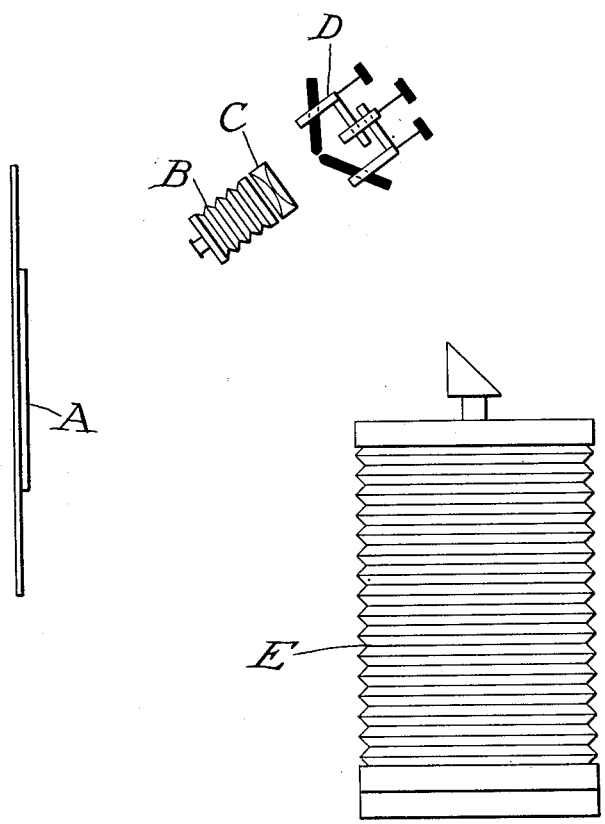
Attest:
Ewd L. Tolson
H. L. Alden.
Inventor:
Edward Henry Gamble,
by Shea Middleton Donaldson
Atty's

UNITED STATES PATENT OFFICE.

EDWARD HENRY GAMBLE, OF LONDON, ENGLAND.

PROCESS FOR THE PRODUCTION OF PHOTOMECHANICAL-PRINTING SURFACES.

1,102,903. Specification of Letters Patent. Patented July 7, 1914.

Application filed June 26, 1913. Serial No. 775,958.

*To all whom it may concern:*

Be it known that I, EDWARD HENRY GAMBLE, a subject of the King of Great Britain, residing at London, England, have invented certain new and useful Improvements in Processes for the Production of Photomechanical-Printing Surfaces, of which the following is a specification.

This invention relates to a process for preparing printing surfaces by photographic means for use in ordinary methods of photomechanical printing. The process used at present has the disadvantage that when a ruled or grained screen is used for the purpose of breaking up the continuous tones of the photograph into a series of separate dots or lines or grains such series of dots presents itself in the parts of the negative which represent the pure white parts of the picture.

The object of my invention is to do away with this disadvantage and to produce negatives the resultant prints from which will either be quite white in the highest lights or have the dots in the highest lights reduced in size as much as may be considered desirable. For lithographic printing it is usually necessary to take the dots away altogether in the highest lights while for typographic printing a very fine series of dots over the high lights may be left.

The invention generally stated consists in illuminating the picture to be copied by projecting upon it a stream of light through a positive transparency of the picture itself. In this manner if the details of the projected image are caused to fall exactly on the corresponding details of the picture, the highlights are illuminated while the tones and shadows are in comparative darkness. In practice I find it advisable to illuminate the picture in this way only for a portion of the full exposure necessary for the plate in the copying camera.

In carrying out my invention I proceed as follows, reference being had to the accompanying drawing showing conventionally apparatus utilizable in carrying out the process.

I first focus the picture to be copied as indicated at A in a copying camera E having a ruled or grained screen in position as is usual in precess engraving. I then set up beside the copying camera a second camera B and take a negative of the picture in it. From this negative I make a strong black and white positive, which positive I place in the dark slide and then return the dark slide to its position in the second camera so that the positive picture occupies the same position that the sensitive plate was in when the negative was taken on it. I then set up behind the second camera a projecting lantern comprising for example condensing lens C and arc lamp D so that I can project a strong stream of light on to the picture being careful that the details of the projected picture fall exactly on the corresponding details of the picture on the copy board. I then proceed to make the negative in the copying camera using the ruled or grained screen and following the ordinary method, but before removing the plate from the camera I give it a supplementary exposure to the picture to be copied while the latter is illuminated by light projected on it through the positive in the second camera.

It was stated above that the dots in the high lights may be wholly or in part avoided. If I wish entirely to obliterate this effect of the ruled or grained screen in the highlights I remove the screen from its position in the copying camera when about to make the supplementary exposure and then darken the room or that part of it where the picture is situated and project the image on to the picture on the copy board through the positive in the second camera. The effect of this is that the white parts of the picture are illuminated while the tones and shadows are in comparative darkness. While the picture is thus illuminated I now give the sensitive plate in the copying camera the supplementary exposure, continuing the latter as long as may be necessary to produce the desired effect which is to give to the white parts of the picture as much density in the negative when it is developed as is needed to prevent any dots appearing in the print. If I wish only to reduce the size of the dots in the highlights I give the supplementary exposure without removing the ruled or grained screen from its place in the copying camera. If it is necessary to take the dark slide away from the camera in order to remove the ruled or grained screen, it will of course be necessary to see that it returns to exactly the same position to avoid getting a double image. It is advisable to place the second camera at such an angle to the picture or the like that no reflections are produced in its surface when the light is projected on to it, an angle of about 45 degrees will usually accomplish this. The image will be distorted in consequence of the camera being placed at such an angle but in projecting the light on to the picture the distortion will be corrected as the optical conditions are the same in the projection as they were in taking the negative.

I claim as my invention:—

1. A process for the production of photomechanical printing surfaces consisting in exposing a picture to the action of a copying camera while it is illuminated by light projected onto it through a positive transparency of itself.

2. A process for the production of photomechanical printing surfaces consisting in exposing a picture to the action of a copying camera while it is illuminated by light projected onto it through a positive transparency of itself registering therewith, the picture being subjected to such illumination for only a portion of the full exposure required, ordinary lighting being employed for the other portion of the exposure.

3. A process for the production of photomechanical printing surfaces consisting in exposing a picture to the action of a copying camera while it is illuminated by light projected onto it through a positive transparency of itself registering therewith, and omitting from the copying camera the usual half tone screen during said exposure of the picture, substantially as described.

In testimony whereof, I affix my signature in presence of two witnesses.

EDWARD HENRY GAMBLE.

Witnesses:
O. J. WORTH,
W. E. ROGERS.